United States Patent [19]

Weder

[11] Patent Number: 5,373,942

[45] Date of Patent: Dec. 20, 1994

[54] SPRING STRIP WRAPPING AND METHOD FOR USING SAME

[75] Inventor: Donald E. Weder, Highland, Ill.

[73] Assignee: Highland Supply Corporation, Highland, Ill.

[21] Appl. No.: 979,494

[22] Filed: Nov. 19, 1992

Related U.S. Application Data

[63] Continuation-in-part of Ser. No. 842,817, Feb. 27, 1992, abandoned, which is a continuation of Ser. No. 586,092, Sep. 19, 1990, abandoned, which is a continuation of Ser. No. 393,992, Aug. 15, 1989, Pat. No. 4,989,396, which is a continuation-in-part of Ser. No. 249,761, Sep. 26, 1988, abandoned, which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned.

[51] Int. Cl.⁵ .................. B65D 37/00; B65B 11/02
[52] U.S. Cl. ...................... 206/423; 53/399; 53/419; 53/461; 229/87.01
[58] Field of Search ............. 53/399, 416, 419, 449, 53/461; 206/423, 442; 229/87.01, 87.02

[56] References Cited

U.S. PATENT DOCUMENTS

| 2,009,511 | 7/1935 | Nydegger | 229/87.01 |
| 3,271,922 | 9/1966 | Wallerstein et al. | 53/399 |
| 3,712,463 | 1/1973 | Bestehorn | 206/232 |
| 4,333,267 | 6/1982 | Witte | 206/423 |
| 4,801,014 | 1/1989 | Meadows | 206/423 |
| 4,989,396 | 2/1991 | Weder et al. | 53/399 |
| 5,007,229 | 4/1991 | Weder et al. | 53/461 |
| 5,181,364 | 1/1993 | Weder | 53/465 |

OTHER PUBLICATIONS

"Speed Sheets", copyrighted brochure, 1990.
"Wrist Wrap" sample product, no date.

Primary Examiner—Jimmy G. Foster
Attorney, Agent, or Firm—Dunlap, Codding & Lee

[57] ABSTRACT

A wrapping having a sheet of material and an elongated spring strip. The spring strip has an internal bias for maintaining an open position and a closed position. In the open position, the spring strip is straight from one end to the other end and has an arch from side edge to side edge. In the closed position, the spring strip is circular with one end overlapping the other end and has no arch from side edge to side edge. To wrap an item, such as a floral grouping, the item is placed against the sheet of material with the spring strip in the open, straight position. A portion of the arch of the spring strip is then flattened and the spring strip snaps from the open position into the closed position. In moving into the closed, circular position, the spring strip forms the sheet of material around the floral grouping.

14 Claims, 3 Drawing Sheets

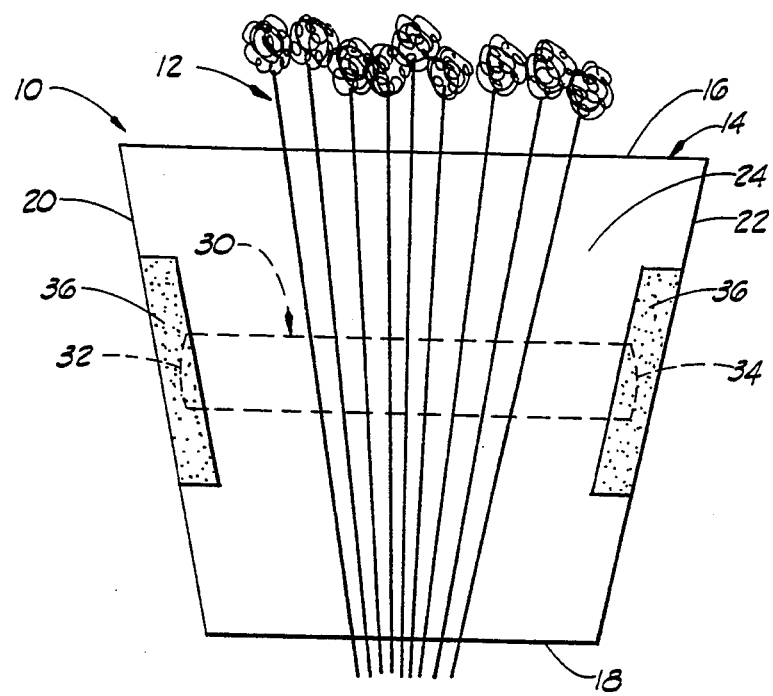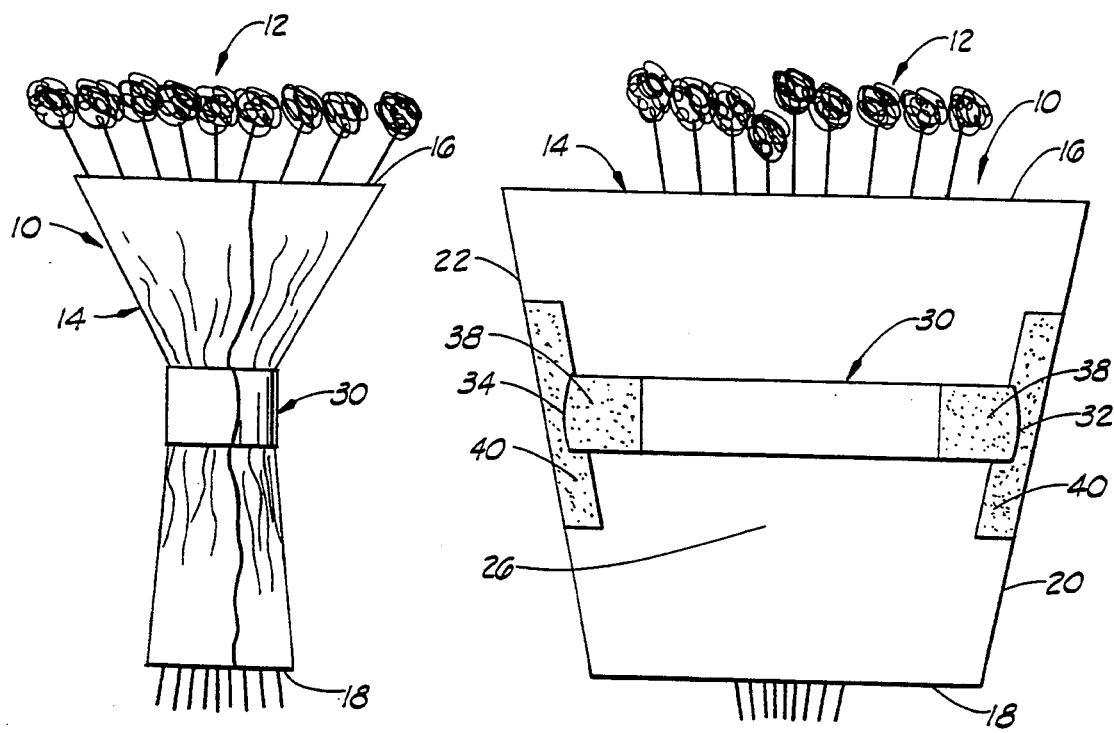

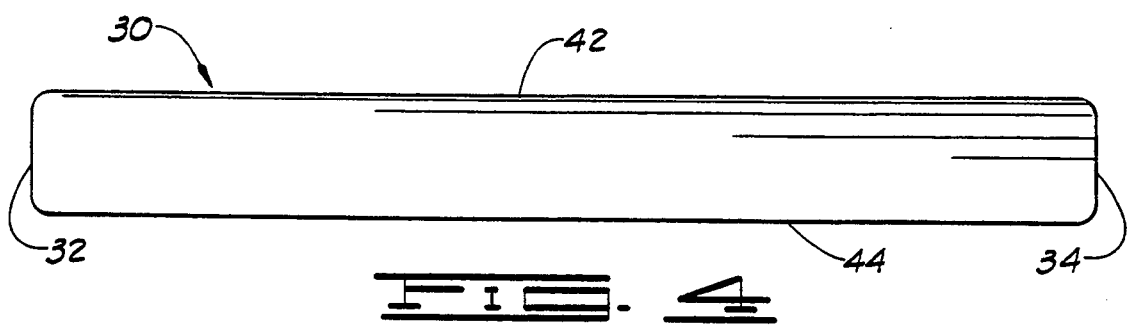
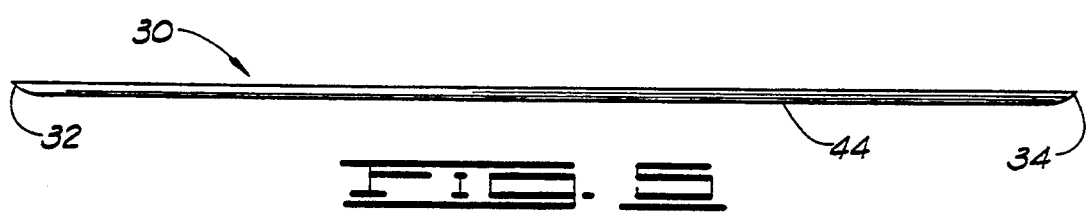
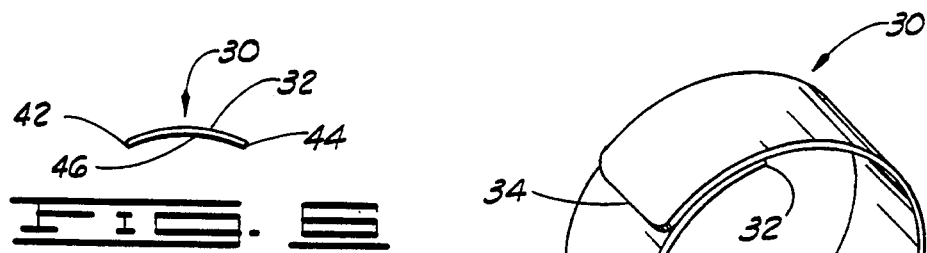
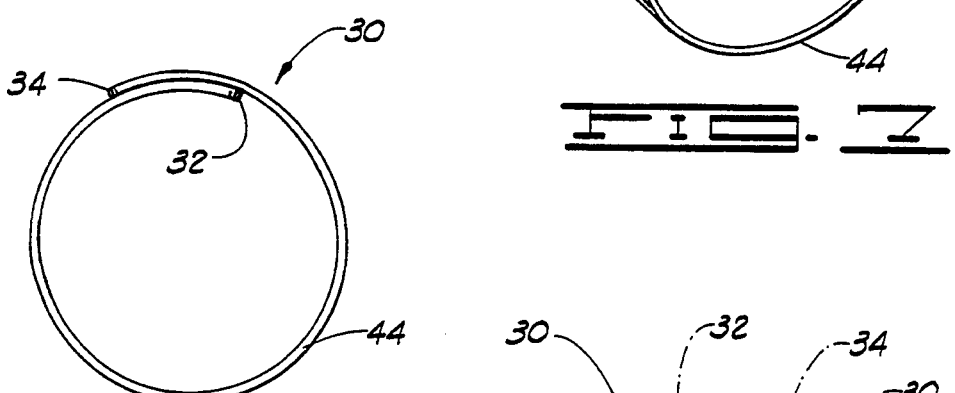
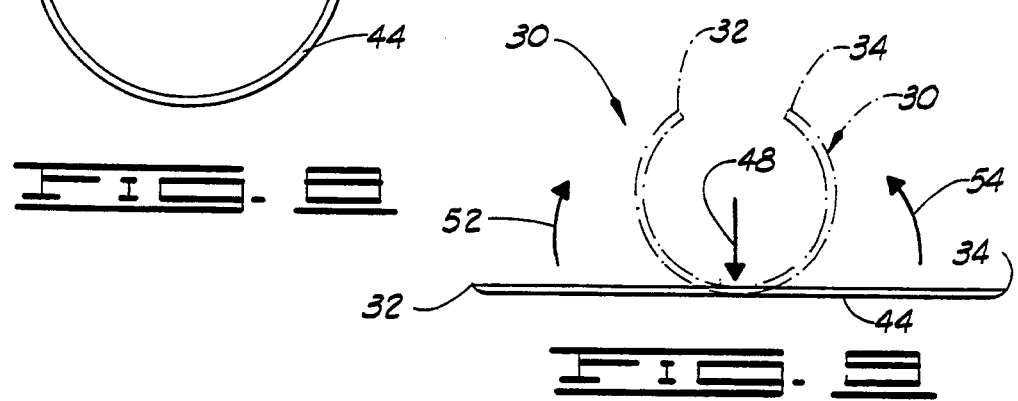

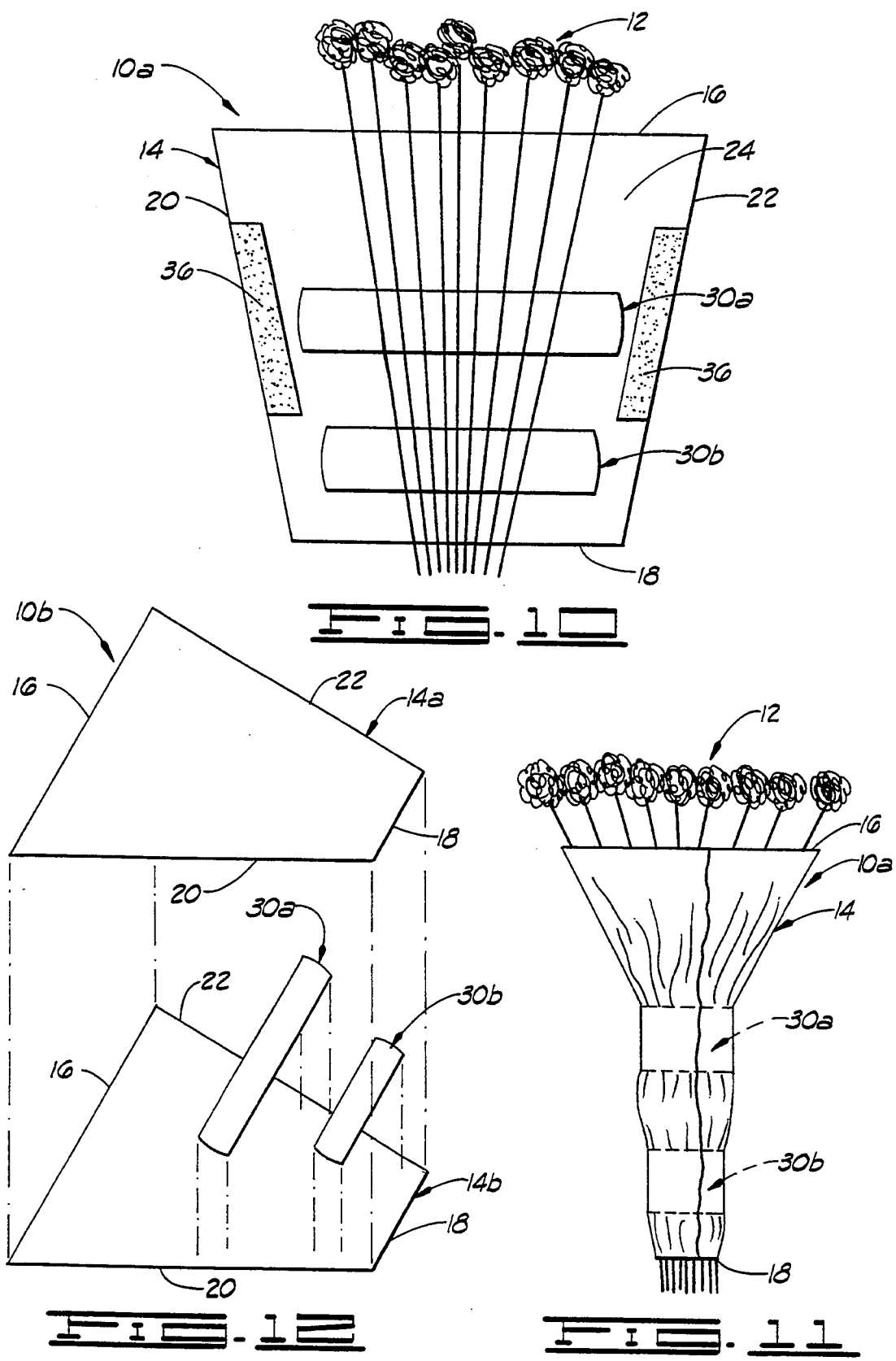

SPRING STRIP WRAPPING AND METHOD FOR USING SAME

This application is a continuation-in-part of U.S. application Ser. No. 07/842,817 filed on Feb. 27, 1992, entitled CURL WRAP AND METHODS FOR USING SAME, now abandoned; which is a continuation of U.S. application Ser. No. 07/586,092, filed on Sep. 19, 1990, entitled CURL WRAP AND METHODS FOR USING SAME, now abandoned; which is a continuation of U.S. application Ser. No. 07/393,992, filed Aug. 15, 1989, entitled, CURL WRAP AND METHODS FOR USING SAME, now U.S. Pat. No. 4,989,396; which is a continuation-in-part of U.S. application Ser. No. 07/249,761, filed Sep. 26, 1988, entitled METHOD FOR WRAPPING AN OBJECT WITH A MATERIAL HAVING PRESSURE SENSITIVE ADHESIVE THEREON, now abandoned; which is a continuation-in-part of U.S. application Ser. No. 07/219,083, filed on Jul. 13, 1988, entitled ARTICLE FORMING SYSTEM, now U.S. Pat. No. 4,897,031; which is a continuation of U.S. application Ser. No. 07/004,275, filed Jan. 5, 1987, entitled ARTICLE FORMING SYSTEM, now U.S. Pat. No. 4,773,182; which is a continuation of U.S. application Ser. No. 06/613,080, filed May 22, 1984, entitled ARTICLE FORMING SYSTEM, now abandoned.

BACKGROUND OF THE INVENTION

1. Field of the Invention

The present invention relates generally to materials for wrapping items and methods of using same.

2. Description of the Related Art

Various wrappings for items, and particularly for floral groupings, are known in the art. For example, U.S. Pat. No. 4,989,396 discloses a curl wrap comprising a material with a preset curl. The curl wrap material is restrained in an uncurled condition and an item is placed on the restrained material. At least one end of the material is then released from restraint to allow the material to curl around the item.

SUMMARY OF THE INVENTION

The present invention comprises a sheet of material sized and shaped for wrapping an item and a spring strip attached to the sheet of material. The spring strip has an internal bias for being in a straight position with an arch from side edge to side edge or in a circular position without an arch.

An item is placed against the sheet of material with the spring strip in the straight position. A portion of the arch of the spring strip is then flattened and the spring strip snaps into the circular position. In moving to the circular position, the spring strip forms the sheet of material around the item.

An object of the present invention is to provide a wrapping which substantially restrains itself in an open position to receive an item to be wrapped.

Another object of the present invention is to provide a wrapping which forms itself around an item with the application of little external force.

Other objects, advantages and features of the present invention are apparent from the following detailed description when read in conjunction with the accompanying drawings and appended claims.

BRIEF DESCRIPTION OF THE DRAWINGS

FIG. 1 is a front view of a wrapping constructed in accordance with the present invention and a floral grouping to be wrapped.

FIG. 2 is a back view of the wrapping and floral grouping of FIG. 1.

FIG. 3 a front view of the floral grouping and the wrapping of FIG. 1 after the floral grouping has been wrapped.

FIG. 4 is a top plan view of the spring strip of the wrapping in the open, or straight, position illustrated in FIGS. 1 and 2.

FIG. 5 is a side elevation of the spring strip of FIG. 4.

FIG. 6 is an end view of the spring strip of FIG. 4.

FIG. 7 is a perspective view of the spring strip of the wrapping in the closed, or circular, position as illustrated in FIG. 3.

FIG. 8 is a side elevation of the spring strip of FIG. 7.

FIG. 9 is a partly diagrammatical side view of the spring strip snapping from the straight position toward the circular position.

FIG. 10 is a front view of a floral grouping to be wrapped and a wrapping having a pair spring strips attached to the front side of a sheet of material.

FIG. 11 is a front view of the wrapping of FIG. 10 after the floral grouping has been wrapped.

FIG. 12 is a partly diagrammatical view of a wrapping having a pair of spring strips laminated between two sheets of material.

DETAILED DESCRIPTION OF THE PREFERRED EMBODIMENTS

Referring now to the drawings in general, and to FIGS. 1 and 2 in particular, shown therein and designated by the general reference numeral 10 is a wrapping which is utilized to wrap any item in accordance with the present invention. Preferably, the item to be wrapped is a floral grouping as generally designated by reference numeral 12 as shown in FIGS. 1, 2, 3, 9 and 10.

"Floral grouping," as used herein, means cut fresh flowers, artificial flowers, a single flower, other fresh and/or artificial plants or other floral materials and may include other secondary plants and/or ornamentation which add to the aesthetics of the overall floral grouping.

The wrapping 10 comprises a sheet of material 14 having a top 16, a bottom 18, a first side 20 and a second side 22, a front surface 24 and a back surface 26. In the embodiment shown in FIGS. 1 and 2, the wrapping 10 includes a spring strip 30 which is connected to the back surface 26 of the material 14 and extends substantially from side 20 to side 22 of the material 14. The spring strip 30 is capable of snapping between a straight configuration, opened position (FIGS. 1 and 2) and a circular configuration closed position (FIG. 3). In snapping from being straight to being circular, the spring strip 30 wraps the material 14 around the floral grouping 12.

Although any shape of the material 14 may be utilized in accordance with the present invention, preferred shapes include rectangles, hearts, circles, triangles, squares and parallelograms. Trapezoidal shapes are preferred in particular for wrapping floral arrangements, which require a tapered shape from the stems to the blooms of the flowers.

The material 14 is constructed from any suitable material that is capable of being wrapped about an item. For example, the material 14 may comprise cloth, paper (untreated or treated in any manner), cellophane, foil, polymer film, or any combination thereof.

A polymer film is relatively strong and not as subject to tearing (substantially non-tearable), as might be the case with paper or foil. The polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications such as wrapping a floral grouping.

Additionally, a relatively thin film of substantially linearly linked processed organic polymer does not substantially deteriorate in sunlight. Processed organic polymer films having carbon atoms both linearly linked and cross linked, and some cross linked polymer films, also may be suitable for use in the present invention provided such films are substantially flexible and can be made in a sheet-like format for wrapping purposes consistent with the present invention.

A decorative pattern, such as a color and/or an embossed pattern, and/or other decorative surface ornamentation may be applied to the material 14 or portions thereof, including, but not limited to printed designs, coatings, colors, flocking or metallic finishes. The material 14 also may be totally or partially clear or tinted transparent material.

The material 14 may be constructed of a single layer of material, partially overlapping layers of material, or completely overlapping layers of the same or different types of materials. Any thickness of the material 14 may be utilized in accordance with the present invention, as long as the material is wrappable about an item by the spring strip 30. In addition, an insulating material such as bubble film, preferably one or two layers, can be utilized to provide protection for the item to be wrapped in the wrapping 10. In a preferred embodiment, the material 14 is constructed from two polypropylene films, such as sheet of Mobil 270 ABW white opaque film laminated to a sheet of Mobil 220 AB clear film, having a thickness in a range of from less than about 1.0 mil to about 2.5 mils.

The spring strip 30 may be attached to the sheet of material 14 in various ways. For example, an adhesive may be used to bond the spring strip 30 to the material 14 continuously over the entire length of the spring strip 30. In the alternative, a suitable adhesive may be used only at selected points of the spring strip 30 for bonding the spring strip 30 to the material 14.

In addition to adhesives, various types of other securing agents may be utilized to secure the spring strip 30 to the material 14. Pressure-sensitive adhesive materials, bands, ribbons, strings, tape, staples or any combinations thereof may be used to connect the spring strip 30 to the material 14. The securing agents may be placed at any part of the spring strip 30. It is important, however, that the spring strip 30 be attached to the material 14 toward ends 32 and 34 of the spring strip 30 in order for the spring strip 30 to control and form the material 14 around the floral grouping 12.

The spring strip 30 itself and any bands, ribbons, strings or tape used to attached the spring strip 30 to the material 14 may have a decorative pattern or be totally or partially clear or be transparently tinted. Such a decorative pattern may be a color and/or an embossed pattern, and may include a printed design, coatings, colors, flocking or metallic finishes. The spring strip 30 may also be encased in a flexible cover or sleeve having a decorative pattern.

As shown in FIG. 1, the front surface 24 of the sheet of material 14 may have adhesive areas 36 for securing the material 14 after being wrapped around the floral grouping 12. Furthermore, as illustrated by FIG. 2, the spring strip 30 may have adhesive areas 38 and the back surface 26 of the sheet of material may have additional adhesive areas 40. Any suitable adhesive substance may be utilized to secure the wrapping 10 around the item.

Of course, a wide variety of securing agents may be used to secure the wrapping 10 around the item. Some examples of securing agents are labels, bands, ribbons, strings, tape, staples or combinations thereof. Some of these agents would bind the circumference of the wrapping 10. Another way to secure the wrapping 10 is to heat seal the ends of the material 14 to another portion of the material 14. One way to do this is to contact the ends of the material 14 with an iron of sufficient heat to heat seal the material 14.

The wrapping 10, after being wrapped around the floral grouping 12, is shown in FIG. 3. In this particular embodiment of the wrapping 10, the spring strip 30 in its circular configuration is positioned around the outside of the sheet of material 14.

As illustrated by FIGS. 4 through 6, the spring strip 30 is a relatively thin, elongated piece of material with opposite first and second ends 32 and 34 and opposite first and second side 42 and 44. The spring strip 30 is typically made of metal, such as steel or a steel alloy, but may be made from a plastic or any other material having a strength and flexibility consistent with the present invention.

As shown in FIGS. 4 through 8, the spring strip 30 is capable of maintaining itself in two positions. The first position, a straight or opened position, is illustrated by FIGS. 4 through 6. The second position, a circular or closed position, is shown in FIGS. 7 and 8.

As shown most clearly in FIG. 6, the spring strip 30 in the straight position has an arch 46 from first side 42 to second side 44. It should be appreciated that the spring strip 30, once placed in the straight position, remains in the straight position until an external force is applied to it. In other words, the spring strip 30 has an internal bias which holds the spring strip 30 in the straight, arched position shown in FIGS. 4 through 6.

The spring strip 30 in the circular, or closed, configuration is illustrated by FIGS. 7 and 8. When the spring strip 30 is closed, its internal bias is translated from a lateral bias, which arches the spring strip 30 transversely, to a longitudinal bias, which wraps the spring strip 30 longitudinally. The closed spring strip 30 is formed in a circle with the second end 34 overlapping the first end 32. As was the case with the straight configuration, the internal bias of the spring strip 30 maintains the spring strip 30 in the closed position until an external force is applied to it.

The snapping movement of the spring strip 30 from the straight position to the closed position is illustrated by FIG. 9. When an external force is applied to flatten a portion of the arch of the spring strip 30, as indicated by direction arrow 48, the internal bias of the spring strip 30 suddenly converts the spring strip 30 from the straight configuration (solid lines) to the closed position. Movement of the spring strip 30 partially into the closed position is indicated by direction arrows 52 and 54 and the spring strip 30 shown in broken lines. Although FIG. 9 illustrates the application of an external force to an intermediate point of the spring strip 30, the spring strip 30 generally responds to a force applied anywhere along its length.

Other preferred embodiments of the wrapping 10a and 10b are shown in FIGS. 10 through 12. As FIG. 10 illustrates, more than one spring strip, such as spring strips 30a and 30b, may be used with the sheet of material 14.

Furthermore, the spring strips 30 may be attached to the front surface 24 of the sheet of material 14 rather than the back surface 26. As shown in FIG. 11, the closed spring strips 30a and 30b attached to the front surface 24 of the sheet of material 14 are inside the sheet of material 14 and are not visible (as indicated by broken lines) when the wrapping 10a is formed around the floral grouping 12.

As illustrated by FIG. 12, the spring strips 30a and 30b may be laminated between two sheets of material 14a and 14b. It should be understood that the sheets of material 14a and 14b need not be the same size. One sheet may be substantially smaller than the other sheet as long as the laminated sheets secure the spring strips 30 to the sheets 14a and 14b.

USE OF THE WRAPPING

The wrapping 10 is used by placing the floral grouping 12 against a central portion of the sheet of material 14 with the spring strip 30 in the straightened position as shown in FIG. 1. An external force is then applied to flatten a portion of the arch of the spring strip 30. The spring strip 30 snaps into the closed circular position, shown in FIG. 3, in response to the flattening of its arch. In snapping into the closed position, the spring strip 30 draws the sheet of material 14 around the floral grouping 12.

The arch 46 of the spring strip 30 may be flattened in any suitable manner. For example, the floral grouping 12 itself may be pressed against the spring strip 30. To avoid impeding the movement of the spring strip 30 and the sheet of material 14, a rod or a ruler may be used to flatten a portion of the arch of the spring strip 30. The rod or ruler is easily withdrawn from the wrapping 10 after the floral grouping 12 is wrapped.

Changes may be made in the combinations, operations and arrangements of the various parts and elements described herein or in the steps or the sequence of steps of the methods described herein without departing from the spirit and scope of the invention as defined in the following claims.

What is claimed is:

1. A wrapping for wrapping a floral grouping comprising:

a sheet of material sized and shaped to be wrapped about at least a portion of the floral grouping;

an elongated spring strip having a first end, a second end, a first side and a second side, said spring strip having an opened position wherein said spring strip is substantially straight from the first end to the second end, the spring strip being movable from the opened position to a closed position by engaging a portion of the spring strip wherein said spring strip in the closed position is substantially arcuate from the first end to the second end, the spring strip being connected to the sheet of material and the floral grouping being disposable on the sheet of material in the opened position of the spring strip wherein the spring strip cooperates to hold the sheet of material in a substantially flat position, the spring strip being engageable for causing the spring strip to be moved to the closed position wherein the spring strip is extended about at least a portion of the floral grouping thereby causing the sheet of material connected thereto to be wrapped about at least a portion of the floral grouping; and a second sheet of material, the spring strip being disposed on the first-mentioned sheet of material and the second sheet of material being disposed on the spring strip with a portion of the second sheet of material being disposed on the first-mentioned sheet of material and the second sheet of material being laminated to the first sheet of material whereby the spring strip is connected to the first-mentioned sheet of material via the lamination of the first-mentioned sheet of material and the second sheet of material.

2. A wrapping for wrapping a floral grouping comprising:

a sheet of material sized and shaped to be wrapped about at least a portion of the floral grouping;

an elongated spring strip having a first end, a second end, a first side and a second side said spring strip having an opened position wherein said spring strip is substantially straight from the first end to the second end, the spring strip being movable from the opened position to a closed position by engaging a portion of the spring strip wherein said spring strip in the closed position is substantially arcuate from the first end to the second end, the spring strip being connected to the sheet of material and the floral grouping being disposable on the sheet of material in the opened position of the spring strip wherein the spring strip cooperates to hold the sheet of material in a substantially flat position, the spring strip being engageable for causing the spring strip to be moved to the closed position wherein the spring strip is extended about at least a portion of the floral grouping thereby causing the sheet of material connected thereto to be wrapped about at least a portion of the floral grouping; and means for securing said spring strip to itself in the closed position.

3. A wrapping comprising:

a floral grouping;

a sheet of material sized and shaped to be wrapped about at least a portion of the floral grouping;

an elongated spring strip having a first end, a second end, a first side, and a second side, said spring strip having an opened position wherein said spring strip is substantially straight from the first end to the second end, the spring strip being moveable from the opened position to a closed position by engaging a portion of the spring strip wherein said spring strip in the closed position is substantially arcuate from the first end to the second end, the spring strip being connected to the sheet of material and the floral grouping being disposable on the sheet of material in the opened position of the spring strip wherein the spring strip cooperates to hold the sheet of material in a substantially flat position, the spring strip being engageable for causing the spring strip to be moved to the closed position wherein the spring strip is extended about at least a portion of the floral grouping thereby causing the sheet of material connected thereto to be wrapped about at least a portion of the floral grouping; and a second sheet of material, the spring strip being disposed on the first-mentioned sheet of material and the second sheet of material being disposed on the spring strip with a portion of the second sheet of material being disposed on the first-mentioned sheet of material and the second sheet of material being laminated to the first sheet of material whereby the spring strip is connected to the first-mentioned sheet of material via the lamination of the first-mentioned sheet of material and the second sheet of material.

4. A wrapping comprising:
a floral grouping;
a sheet of material sized and shaped to be wrapped about at least a portion of the floral grouping;
an elongated spring strip having a first end, a second end, a first side, and a second side, said spring strip having an opened position wherein said spring strip is substantially straight from the first end to the second end, the spring strip being moveable from the opened position to a closed position by engaging a portion of the spring strip wherein said spring strip in the closed position is substantially arcuate from the first end to the second end, the spring strip being connected to the sheet of material and the floral grouping being disposable on the sheet of material in the opened position of the spring strip wherein the spring strip cooperates to hold the sheet of material in a substantially flat position, the spring strip being engageable for causing the spring strip to be moved to the closed position wherein the spring strip is extended about at least a portion of the floral grouping thereby causing the sheet of material connected thereto to be wrapped about at least a portion of the floral grouping; and
means for securing said spring strip to itself in the closed position.

5. A method of wrapping a floral grouping comprising: providing the floral grouping;
providing a sheet of material sized and shaped to be wrapped around the floral grouping, the sheet of material having a first end, a second end, a first side and a second side, and being a spring strip connected to the sheet of material, the spring strip being capable of maintaining an opened position wherein the spring strip is substantially straight from the first end to the second end and has an arch from the first side to the second side, and a closed position wherein the spring strip is circular from the first end to the second end and is substantially flat from the first side to the second side;
positioning the floral grouping to be wrapped on the sheet of material with the spring strip in the opened position; and
flattening a portion of the arch of the spring strip to spring the spring strip into the closed position and form the sheet of material around the floral grouping.

6. A wrapping for a floral grouping, the wrapping comprising:
a sheet of material having a front surface and a back surface, a floral grouping disposed on the back surface of the sheet material, said sheet of material sized and shaped to be wrapped about at least a portion of said floral grouping; and an elongated spring strip disposed on and connected to the back surface of said sheet of material, said spring strip being biased to sustain itself in either a straight configuration or a circular configuration, said spring strip in the straight configuration having an arch across the width thereof and being straight for the length thereof, said spring strip in the circular configuration substantially defining a circle over the length thereof, and said spring strip being flexible to snap from the straight configuration into the circular configuration in response to pressure on the arch thereof;
wherein said spring strip and said sheet of material cooperate to move said sheet of material around at least a portion of a floral grouping disposed on said sheet of material when said spring strip snaps from the straight configuration into the circular configuration.

7. A wrapping for a floral grouping, the wrapping comprising:
a sheet of material having a front surface and a back surface, a floral grouping disposed on the front surface of the sheet material, said sheet of material sized and shaped to be wrapped about at least a portion of said floral grouping; and
an elongated spring strip disposed on and connected to the front surface of said sheet of material, said spring strip being biased to sustain itself in either a straight configuration or a circular configuration, said spring strip in the straight configuration having an arch across the width thereof and being straight for the length thereof, said spring strip in the circular configuration substantially defining a circle over the length thereof, and said spring strip being flexible to snap from the straight configuration into the circular configuration in response to pressure on the arch thereof;
wherein said spring strip and said sheet of material cooperate to move said sheet of material around at least a portion of a floral grouping disposed on said sheet of material when said spring strip snaps from the straight configuration into the circular configuration.

8. A wrapping for a floral grouping, the wrapping comprising:
a sheet of material sized and shaped to be wrapped about at least a portion of said floral grouping; and
an elongated spring strip connected to said sheet of material and being biased to sustain itself in either a straight configuration or a circular configuration, said spring strip in the straight configuration having an arch across the width thereof and being straight for the length thereof, said spring strip in the circular configuration substantially defining a circle over the length thereof, and said spring strip being flexible to snap from the straight configuration into the circular configuration in response to pressure on the arch thereof;
wherein said spring strip and said sheet of material cooperate to move said sheet of material around at least a portion of a floral grouping disposed on said sheet of material when said spring strip snaps from the straight configuration into the circular configuration, and
wherein said spring strip in the circular configuration extends circumferentially about the portion of the floral grouping disposed on said sheet of material.

9. The wrapping of claim 8 wherein the sheet of material is defined further as having a top and a bottom, a first side and a second side, and wherein the first end of the spring strip is disposed near the first side of the sheet of material and the second end of the spring strip is disposed near the second side of the sheet of material, the spring strip extending between the first and the second sides of the sheet of material.

10. The wrapping of claim 8 wherein the spring strip is defined further as being constructed of a material selected from a group of materials consisting of a metal or a plastic or combinations thereof.

11. The wrapping of claim 8 wherein said sheet of material is constructed from a material in the group of materials consisting of paper, cellophane, foil, man-made organic polymer film, cloth (natural or synthetic) or burlap (natural or synthetic) or combinations thereof.

12. The wrapping of claim 8 wherein said sheet of material further comprises:
   means for securing said sheet of material to itself in a position of being wrapped around the floral grouping.

13. A wrapping for a floral grouping, the wrapping comprising:
   a sheet of material sized and shaped to be wrapped about at least a portion of a floral grouping; and
   an elongated spring strip adhesively connected to said sheet of material and being biased to sustain itself in either a straight configuration or a circular configuration, said spring strip in the straight configuration having an arch across the width thereof and being straight for the length thereof, said spring strip in the circular configuration substantially defining a circle over the length thereof, and said spring strip being flexible to snap from the straight configuration into the circular configuration in response to pressure on the arch thereof;
   wherein said spring strip and said sheet of material cooperate to move said sheet of material around at least a portion of a floral grouping disposed on said sheet of material when said spring strip snaps from the straight configuration into the circular configuration.

14. A wrapping for a floral grouping, the wrapping comprising:
   a sheet of material sized and shaped to be wrapped about at least a portion of a floral grouping;
   an elongated spring strip connected to said sheet of material and being biased to sustain itself in either a straight configuration or a circular configuration, said spring strip in the straight configuration having an arch across the width thereof and being straight for the length thereof, said spring strip in the circular configuration substantially defining a circle over the length thereof, and said spring strip being flexible to snap from the straight configuration into the circular configuration in response to pressure on the arch thereof; and
   means for securing said spring strip to itself in the circular configuration;
   wherein said spring strip and said sheet of material cooperate to move said sheet of material around at least a portion of a floral grouping disposed on said sheet of material when said spring strip snaps from the straight configuration into the circular configuration.

* * * * *